US010275604B2

(12) United States Patent
Lopez et al.

(10) Patent No.: US 10,275,604 B2
(45) Date of Patent: Apr. 30, 2019

(54) SECURITY RECORD TRANSFER IN A COMPUTING SYSTEM

(71) Applicant: HEWLETT PACKARD ENTERPRISE DEVELOPMENT LP, Houston, TX (US)

(72) Inventors: Scott Lopez, Houston, TX (US); Jeff Kalibjian, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 208 days.

(21) Appl. No.: 15/500,905

(22) PCT Filed: Oct. 31, 2014

(86) PCT No.: PCT/US2014/063435
§ 371 (c)(1),
(2) Date: Jan. 31, 2017

(87) PCT Pub. No.: WO2016/068996
PCT Pub. Date: May 6, 2016

(65) Prior Publication Data
US 2017/0220812 A1 Aug. 3, 2017

(51) Int. Cl.
*H04L 29/06* (2006.01)
*G06F 21/60* (2013.01)
(Continued)

(52) U.S. Cl.
CPC .......... *G06F 21/606* (2013.01); *G06F 21/577* (2013.01); *G06F 21/602* (2013.01); *H04L 9/0822* (2013.01); *G06F 2221/034* (2013.01)

(58) Field of Classification Search
CPC .... G06F 21/606; G06F 21/577; G06F 21/602; G06F 2221/034; H04L 9/0822
See application file for complete search history.

(56) References Cited

U.S. PATENT DOCUMENTS 7,660,419 B1    2/2010  Ho
8,046,195 B2   10/2011  Vecera et al.
(Continued)

FOREIGN PATENT DOCUMENTS

WO    2008/121744 A2    10/2008

OTHER PUBLICATIONS

The Open Group, "SOA Reference Architecture Technical Standard: Integration Layer," 8 p, Sep. 22, 2014.
(Continued)

*Primary Examiner* — Sarah Su
(74) *Attorney, Agent, or Firm* — Hewlett Packard Enterprise Patent Department

(57) ABSTRACT

An input monitoring agent detects storage of a security record by a security scanning application, encrypts a copy of the security record, and deletes the security record. A secure transfer queue decrypts the encrypted security record, translates the security record for use by a security monitoring application, and encrypts the translated security record. An output monitoring agent predicts when a security monitoring application will attempt to import a new security file, decrypts and stores the encrypted translated security record as the new security file, and deletes the new security file when the security monitoring application has completed importation.

15 Claims, 6 Drawing Sheets

(51) Int. Cl.
*G06F 21/57* (2013.01)
*H04L 9/08* (2006.01)

(56) References Cited

U.S. PATENT DOCUMENTS

| | | | |
|---|---|---|---|
| 8,090,660 B2 | 1/2012 | Solomon et al. | |
| 8,112,434 B2 | 2/2012 | Patten et al. | |
| 8,156,140 B2 | 4/2012 | Roshen et al. | |
| 8,200,278 B2 | 6/2012 | Little | |
| 8,265,275 B2 | 9/2012 | Lotspiech | |
| 8,271,778 B1* | 9/2012 | Zhou | H04L 43/04 709/224 |
| 8,321,909 B2 | 11/2012 | Fot et al. | |
| 8,364,745 B2 | 1/2013 | Roshen | |
| 8,379,847 B2 | 2/2013 | Bell et al. | |
| 8,433,746 B2 | 4/2013 | Vecera et al. | |
| 8,458,793 B2 | 6/2013 | McKenna | |
| 8,489,733 B2 | 7/2013 | Vecera et al. | |
| 8,561,175 B2 | 10/2013 | Williams et al. | |
| 8,570,905 B2 | 10/2013 | Hulse et al. | |
| 8,613,043 B2 | 12/2013 | Fot et al. | |
| 8,655,941 B2 | 2/2014 | Roshen | |
| 8,707,427 B2 | 4/2014 | Hooks et al. | |
| 8,775,651 B2 | 7/2014 | Brown et al. | |
| 8,909,881 B2* | 12/2014 | Bunte | G06F 11/1451 711/161 |
| 2006/0005010 A1 | 1/2006 | Olsen et al. | |
| 2006/0031938 A1* | 2/2006 | Choi | G06F 21/552 726/25 |
| 2006/0101517 A1 | 5/2006 | Banzhof et al. | |
| 2007/0100913 A1 | 5/2007 | Sumner et al. | |
| 2008/0092237 A1* | 4/2008 | Yoon | G06F 21/577 726/25 |
| 2008/0140759 A1 | 6/2008 | Conner et al. | |
| 2009/0006167 A1 | 1/2009 | Toussaint et al. | |
| 2009/0064271 A1 | 3/2009 | Ng et al. | |
| 2009/0086965 A1* | 4/2009 | Glendinning | G06F 12/1408 380/44 |
| 2010/0100965 A1 | 4/2010 | O'Brien et al. | |
| 2010/0174684 A1* | 7/2010 | Schwaab | G06F 11/1451 707/655 |
| 2011/0125527 A1 | 5/2011 | Nair | |
| 2011/0153712 A1 | 6/2011 | Whetsel | |
| 2011/0302412 A1 | 12/2011 | Deng et al. | |
| 2012/0166799 A1* | 6/2012 | Shamsaasef | G06F 21/10 713/168 |
| 2012/0174185 A1 | 7/2012 | Milman et al. | |
| 2012/0185725 A1 | 7/2012 | Peters et al. | |
| 2013/0086689 A1 | 4/2013 | Laverdiere-Papineau | |
| 2013/0104236 A1 | 4/2013 | Ray et al. | |
| 2013/0318536 A1 | 11/2013 | Fletcher et al. | |
| 2014/0068630 A1 | 3/2014 | Fildebrandt | |
| 2014/0082736 A1* | 3/2014 | Guarnieri | G06F 21/577 726/25 |
| 2014/0164776 A1 | 6/2014 | Hook et al. | |
| 2014/0177839 A1 | 6/2014 | Wagner et al. | |
| 2014/0189340 A1 | 7/2014 | Hadley | |
| 2015/0326547 A1* | 11/2015 | Carlson | H04L 63/061 713/171 |

OTHER PUBLICATIONS

Reserve Bank of India, "Working Group Report on Cloud Computing Option for Urban Cooperative Banks," Oct. 5, 2012, pp. 1-18, Available at: <rbi.org.in/scripts/PublicationReportDetails.aspx?ID=679>.

Lisa Phifer, "Managing WLAN Risks with Vulnerability Assessment," Technology Whitepaper, 2011, pp. 1-23, AirMagnet, Inc.

International Search Report and Written Opinion received for PCT Patent Application No. PCT/US2014/063435, dated Jun. 29, 2015, 9 pages.

International Search Report and Written Opinion received for PCT Patent Application No. PCT/US2014/063314, dated Jul. 31, 2015, 12 pages.

International Preliminary Report on Patentability received for PCT Patent Application No. PCT/US2014/063435, dated May 11, 2017, 8 pages.

International Preliminary Report on Patentability received for PCT Patent Application No. PCT/US2014/063314, dated May 11, 2017, 11 pages.

Eldos Corporation, "Securing Your Client-server or Multi-tier Application," 2014, pp. 1-16 [online], Retrieved from the Internet on Sep. 23, 2014 at URL: <eldos.com/security/articles/1942.php?page=all>.

Dan Schutzer et al., "Big Data and Security," The Innovator, Jan. 2013, pp. 1-23, vol. 54, Issue 1, BITS Financial Services Roundtable.

* cited by examiner

SECURITY RECORD TRANSFER IN A COMPUTING SYSTEM

BACKGROUND

Computer security is directed to ensuring the reliable operation of networking and computing resources, and to protecting information on a computer or computer network from unauthorized corruption, access or disclosure. Vulnerabilities are security defects in a computer system or associated software that allow an attacker to potentially violate the confidentiality, integrity, operations, availability, access control, and/or data of the system or software. Vulnerabilities may result from bugs, design flaws, configuration errors, etc. in the system or software. Various tools have been developed to aid in management of computer system security.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct wired or wireless connection. Thus, if a first device couples to a second device, that connection may be through a direct connection or through an indirect connection via other devices and connections.

In a computing system that includes continuous monitoring for security vulnerabilities, the flow of security information should be secured so that identified vulnerabilities can be reliably tracked and remediated. Additionally, a variety of scanning and remediation tools should be accommodated to improve the likelihood of identifying and correcting system vulnerabilities. Unfortunately, currently available security products vary widely in the level of data protection and format translation provided. The security information transfer system disclosed herein enhances the protection of information flow between scanning tools and monitoring applications by encrypting all transfers of security information, and minimizing the time that unencrypted security information is stored in the system. The system also simplifies integration and application of scanning tools by providing translation of tool output for use by monitoring applications as part of the secure transfer mechanism.

Figure 1:
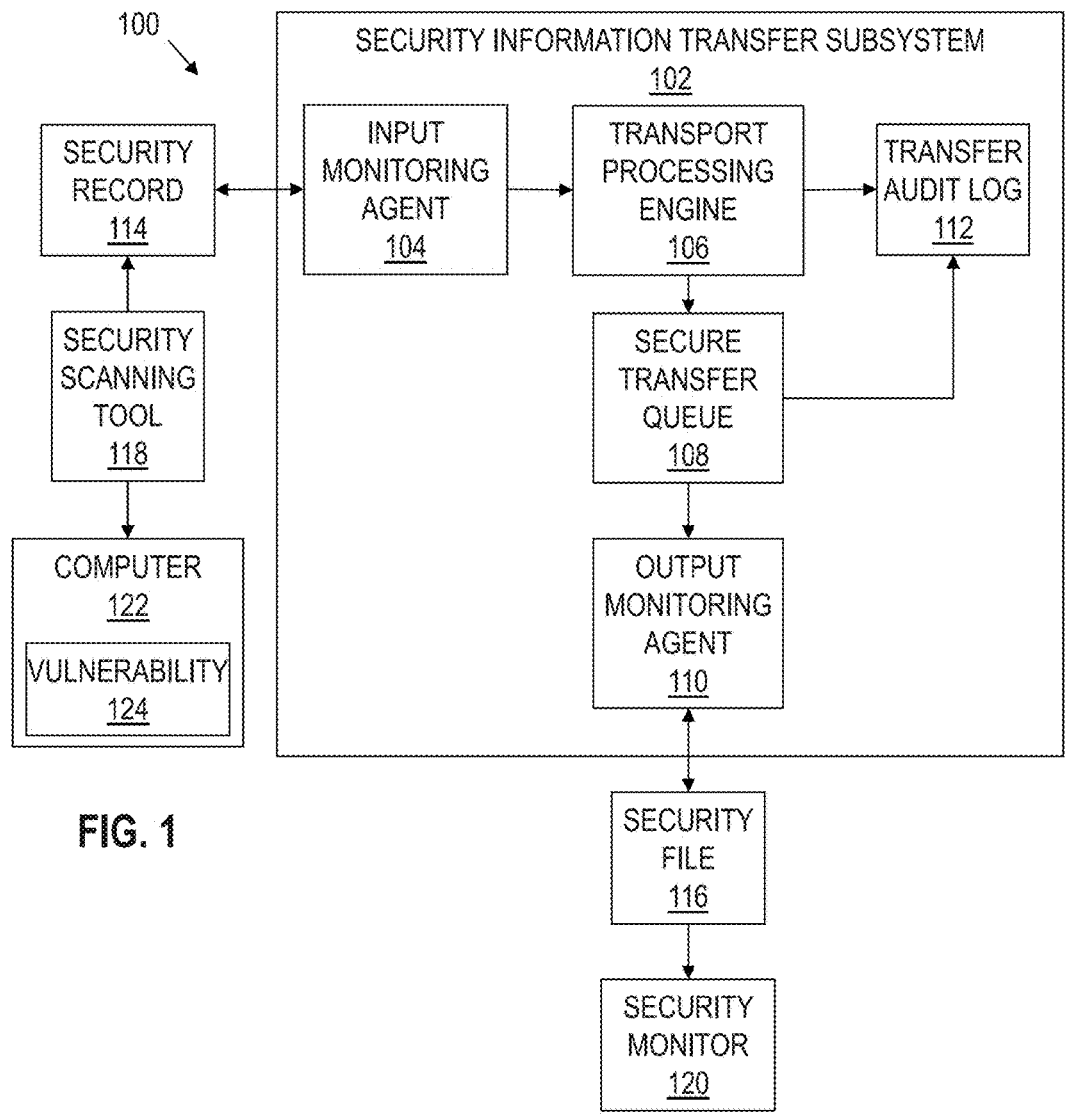
FIGS. 1-3 show block diagrams of systems for secure transport of security information in accordance with various examples.
Figure 2:
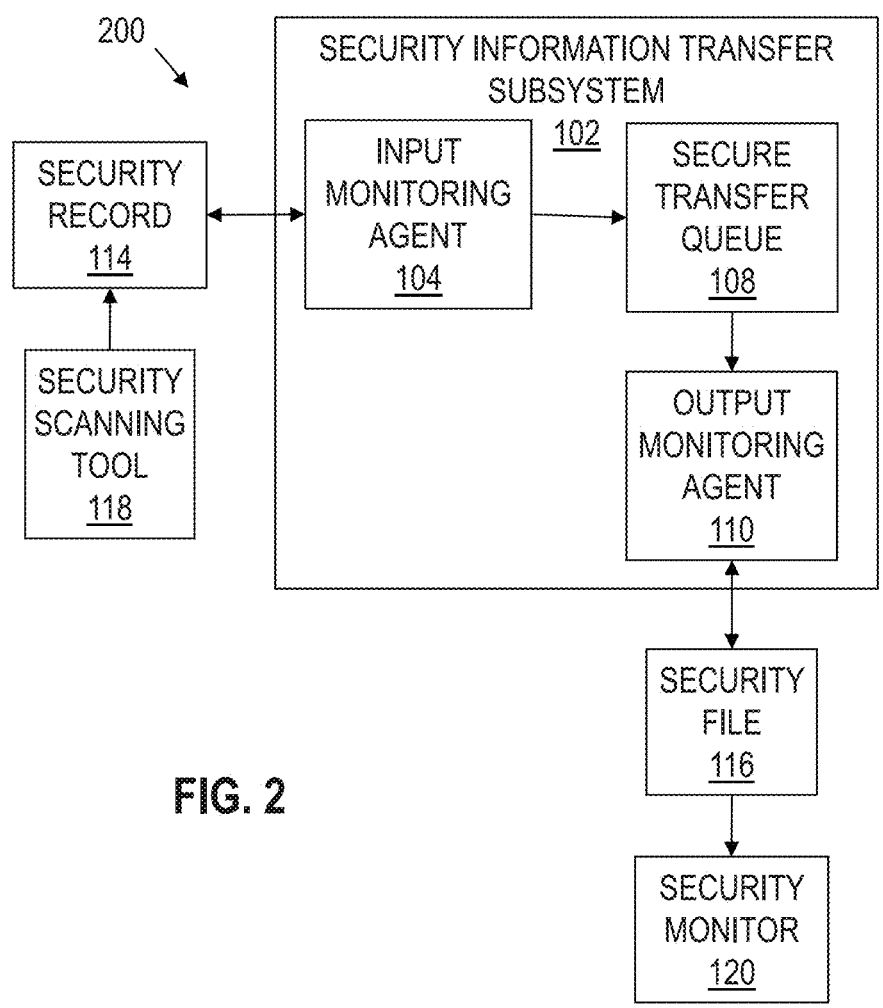
Figure 3:
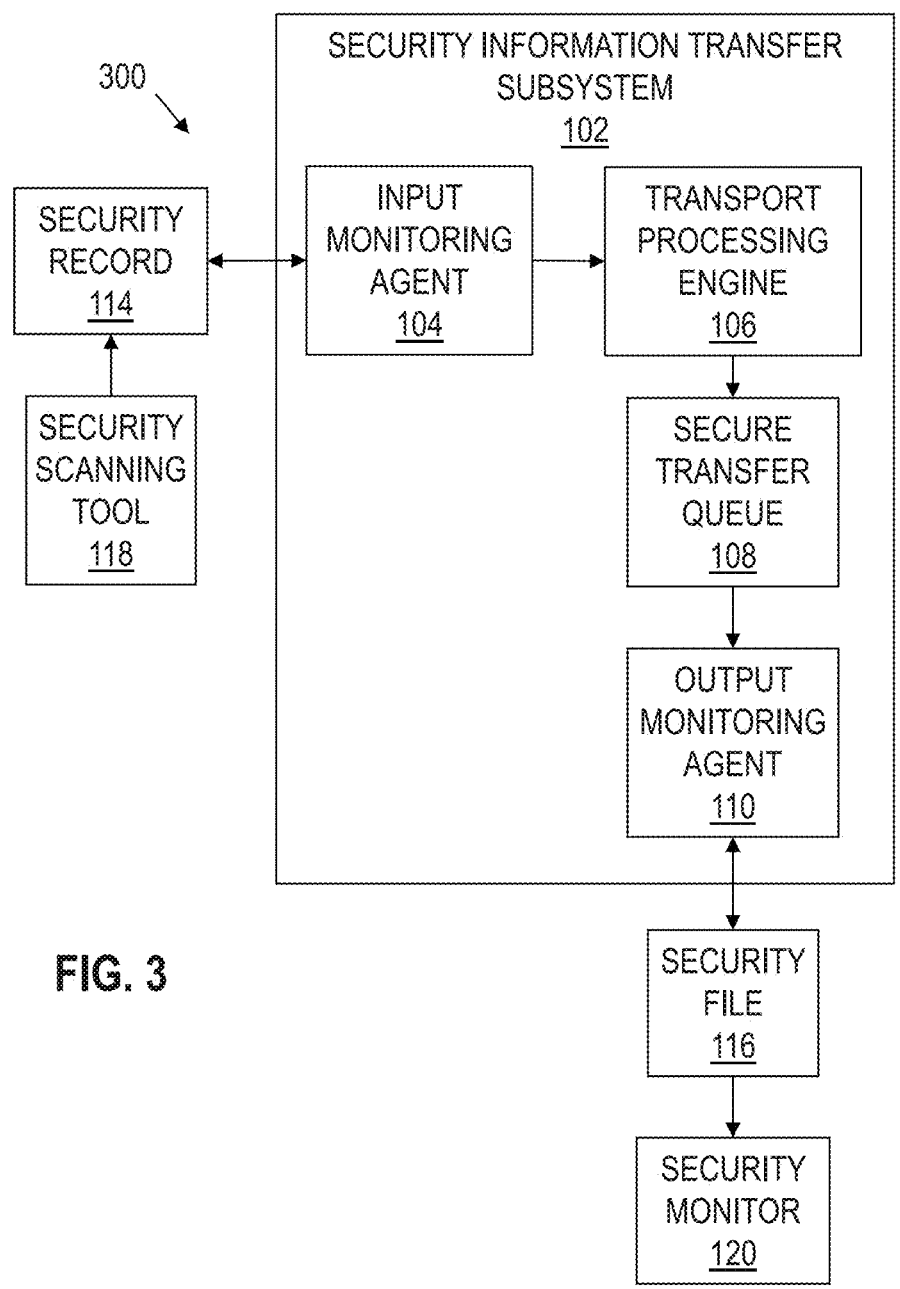

FIGS. 1, 2 and 3 show block diagrams of systems 100, 200, and 300 for secure transport of security information in accordance with various examples. The system 100 includes a security information transfer subsystem 102 that provides secure transfer of security information in the system 100. The system 100 also includes a security scanning tool 118 that scans computers of the system 100 for vulnerabilities. In practice, the system 100 may include a number of different security scanning tools 118 to identify different vulnerabilities in the computers of the system 100. The security scanning tool 118 may continually scan the computers of the system 100 for vulnerabilities. Computer 122, shown in FIG. 1, is representative of computers in the system 100. In practice, the system 100 may include a large number (e.g., hundreds) of computers. The system 100 also includes a security monitor 120. The security monitor 120 communicates with the security information transfer subsystem 102, and provides system-wide tracking of vulnerabilities identified in the computers of the system 100. For example, the security monitor 120 may provide a dashboard display of vulnerabilities identified, vulnerabilities corrected, vulnerability correction status, etc. for the computers of the system 100.

The security information transfer subsystem 102 includes an input monitoring agent 104, a transport processing engine 106, a secure transport queue 108, an output monitoring agent 110, and an audit log 112. The input monitoring agent 104 tracks the security scanning tool 118 to identify security records generated by the security scanning tool 118. When the security scanning tool 118 identifies a vulnerability 124 in the computer 122, the security scanning tool 118 generates a security record 114 that includes information identifying the vulnerability 124, identifying the computer 122 where the vulnerability 124 is located, etc. In various implementations, the security record 114 may be provided in the form of a file or other data arrangement or storage structure. The security scanning tool 118 may store the security record 114 on a volatile or non-volatile storage device accessible to the input monitoring agent 104. For example, the security scanning tool 118 may store the security record 114 as a file that is part of a file system residing on a storage device of the system 100 that is accessible to both the security scanning tool 118 and the input monitoring agent 104. The input monitoring agent 104 may monitor the storage device for creation and completion of the storage record 114 by the security scanning tool 118. The input monitoring agent 104 may detect creation and/or completion of the security record 114 via file status reporting functions provided by an operating system that services the input monitoring agent 104.

When the input monitoring agent 104 determines that the security record 114 is complete (e.g., the security scanning tool 118 has created, written, and closed a file containing the security record 114), the input monitoring agent 104 copies the security record 114, and encrypts the copy of the security record 114. When the security record 114 has been copied, the input monitoring agent 104 immediately deletes the security record 114 from the storage device on which the security scanning tool 118 stored the security record 114. By copying the security record 114 and deleting the security record 114 as soon as the security record 114 has been copied, the input monitoring agent 104 minimizes the time that the security record 114 is present in the system 100 in an unencrypted form, and therefore minimizes the time during which the security record 114 can be intercepted and modified or copied by a hostile entity. In some computing systems, using basic operating services for file deletion may not actually erase file data from the storage media. For example, a pointer to the file may be deleted (making the file invisible to the operating system), but the actual file data may remain on the disk or other storage device. Some implementations of the input monitoring agent 104 may employ erasure techniques that ensure removal (i.e., erasure) of the data of the security record 114 from storage media.

The input monitoring agent 104 may generate a new symmetric encryption key to use to encrypt each security record 114. The new encryption key may itself be encrypted using the public key of the secure transfer queue 108.

The input monitoring agent 104 constructs a transport block that includes the encrypted copy of the security record 114, the encrypted encryption key used to encrypt the security record 114, and unencrypted information describing the security record 114. In some implementations, the transport block may be formatted as:

| | |
|---|---|
| Revision Number | Revision of the block |
| Block Type | Transport or Processed |
| Data Size | Size of the Encrypted Data |
| Compression Type | Non-zero value indicates the encrypted security record is compressed |
| Block Count | Number of blocks into which the security record is divided |
| Encryption Key | Encryption key applied to encrypt the security record |
| Encrypted Data | Security record |
| Data Type | Data type of the security record |
| Destination Data Type/ | Data type supported by the Security Monitor, or |
| Destination Address | Destination Address if Processed Block |
| Digital Signature | Digital signature over all fields of the block |

The input monitoring agent 104 possesses a digital identity that allows secure communication with the transport processing engine 106 using a secure protocol (e.g., Web Services, HTTPS, etc.). The input monitoring agent 104 may also compress the security record 114 before encryption, and/or may subdivide the security record 114 into many smaller records, then encrypt and transport each new record using a plurality of transport blocks.

The input monitoring agent 104 transfers the transport block to the transport processing engine 106. The secure communication link between the input monitoring agent 104 and the transport processing engine 106 is terminated on completion of transport block transfer. The transport processing engine 106 provides logging services, and interfaces to the secure transfer queue 108. On receipt of a transport block (and after verifying the digital signature around the block), the transport processing engine 104 extracts the unencrypted information from the transport block and records the information in the transfer audit log 112. In some implementations, the transfer audit log itself could be periodically digitally signed to protect the information content from tampering by an adversary. In some implementations, the transport processing engine 106 records the encrypted security record 114 and/or the entire transport block to the transfer audit log 112. In some implementations, an entry in the transfer audit log 112 may be formatted as:

| | |
|---|---|
| Time | Time of log entry |
| Date | Date of log entry |
| Requestor ID | Identity of entity requesting transfer subsystem processing |
| Requested Function | Requested data transformation function |
| Input format | Format of the input data received |
| Output format | Desired output format of data to be sent to security monitor |
| Hash of Input Data | SHA hash of input data |
| Size of Input Data | Size of input data |
| Hash of Output Data | SHA hash of output data generated via format transformation by secure transfer queue |
| Size of Output Data | Size of the output data generated |
| Location of Input Data | Optional location of encrypted copy of input data |
| Location of Output Data | Optional location of copy of encrypted output data |

The transport processing engine 106 also transfers the transport block to the secure transfer queue 108. Thus, the transport block is transferred from the input monitoring agent 104 to the secure transfer queue via the transport processing engine 106. The secure transfer queue 108 receives the transport block from the transport processing engine 106, and verifies the digital signature included in the transport block. If the digital signature fails to verify, then the transport block may be discarded. The secure transfer queue 108 examines the transport block and determines whether the copy of the security record 114 included in the transport block is to be translated to a different format for use by the security monitor 120. The transport block specifies the type (i.e., format) of the security record 114 in the transport block and the format used by the security monitor 120. If the types are different, indicating that translation is to be performed, then the secure transfer queue 108 translates the security record 114 included in the transport block to the format specified in the transport block after the security record has been decrypted. To decrypt the security record 114 included in the transport block, the secure transport queue 108 first decrypts the encrypted symmetric encryption key included in the transport block using the private key of the secure transport queue 108, and then applies the decrypted symmetric key created by the input monitoring agent 104 to decrypt the encrypted security record 114.

After the decrypted security record 114 has been translated and/or is to be transferred to a new destination (e.g., the security monitor 120), the secure transport queue 108 may generate a new symmetric encryption key for each security record 114 and encrypt the translated security record 114 using the new symmetric encryption key. The new symmetric encryption key is then encrypted using the public key of the output monitoring agent 110 and transferred in conjunction with the encrypted translated security record 114.

The secure transport queue 108 constructs a processed block to transfer the encrypted translated security record. The format of the processed block is illustrated above in conjunction with the transport block format. The processed block also specifies the format of the translated security record, the encryption key used to encrypt the translated security record, size and number of blocks, destination address, etc. The secure transport queue 108 digitally signs the processed block.

In some implementations, the secure transport queue 108 may also communicate with the transfer audit log 112 to record security records 114, translated security records 114, etc.

The secure transport queue 108 establishes a secure (mutually authenticated) communication link with the output monitoring agent 110 corresponding to the destination address specified in the processed block, and transfers the processed block to the output monitoring agent 110 via the secure communication link. The secure transport queue 108 terminates the secure communication link when transfer of the processed block is complete.

On receipt of a processed block, the output monitoring agent 110 verifies the digital signature of the processed block. If the digital signature fails to verify, the processed block may be discarded. The output monitoring agent 110 monitors or learns the input timing of the security monitor 120, and predicts based on the monitored input timing, when the security monitor 120 will attempt to import a new security record. The security monitor 120 may import a security record by reading the security record from a file (i.e., a security file 116) stored on a storage device of the system 100.

Immediately prior to the predicted time that the security monitor 120 will attempt to import a security record, the output monitoring agent 110 uses its private key to decrypt the encrypted symmetric encryption key included in the processed block. Using the now decrypted symmetric encryption key provided in the processed block, the output monitoring agent 110 decrypts the translated security record included in the processed block, and writes the decrypted translated security record to a file (i.e., a security file 116) for importation by the security monitor 120. For example, the output monitoring agent 110 may decrypt the translated security record no more than a few seconds (e.g., 15 seconds) or other predetermined interval prior to the predicted time of importation by the security monitor 120.

The output monitoring agent 110, monitors importation of the security file 116 by the security monitor 120, and immediately after the importation is complete, the output monitoring agent 110 deletes the security file 116. Additional file erasure measures discussed herein may also be utilized by the output monitoring agent 110. For example, the output monitoring agent 110 may monitor the status of the security file 116 to determine when the file is opened and closed. When the file is opened and subsequently closed, the output monitoring agent may immediately delete the security file 116 from storage. If the security file 116 is not opened within a predetermined interval after the predicted time of importation by the security monitor 120, the output monitoring device 118 may delete the security file 116, predict the time of the next attempted importation, and repeat translated security record decryption and security file creation. Thus, the output monitoring agent 110 minimizes the time that the translated security record is available in unencrypted form.

Figure 4:
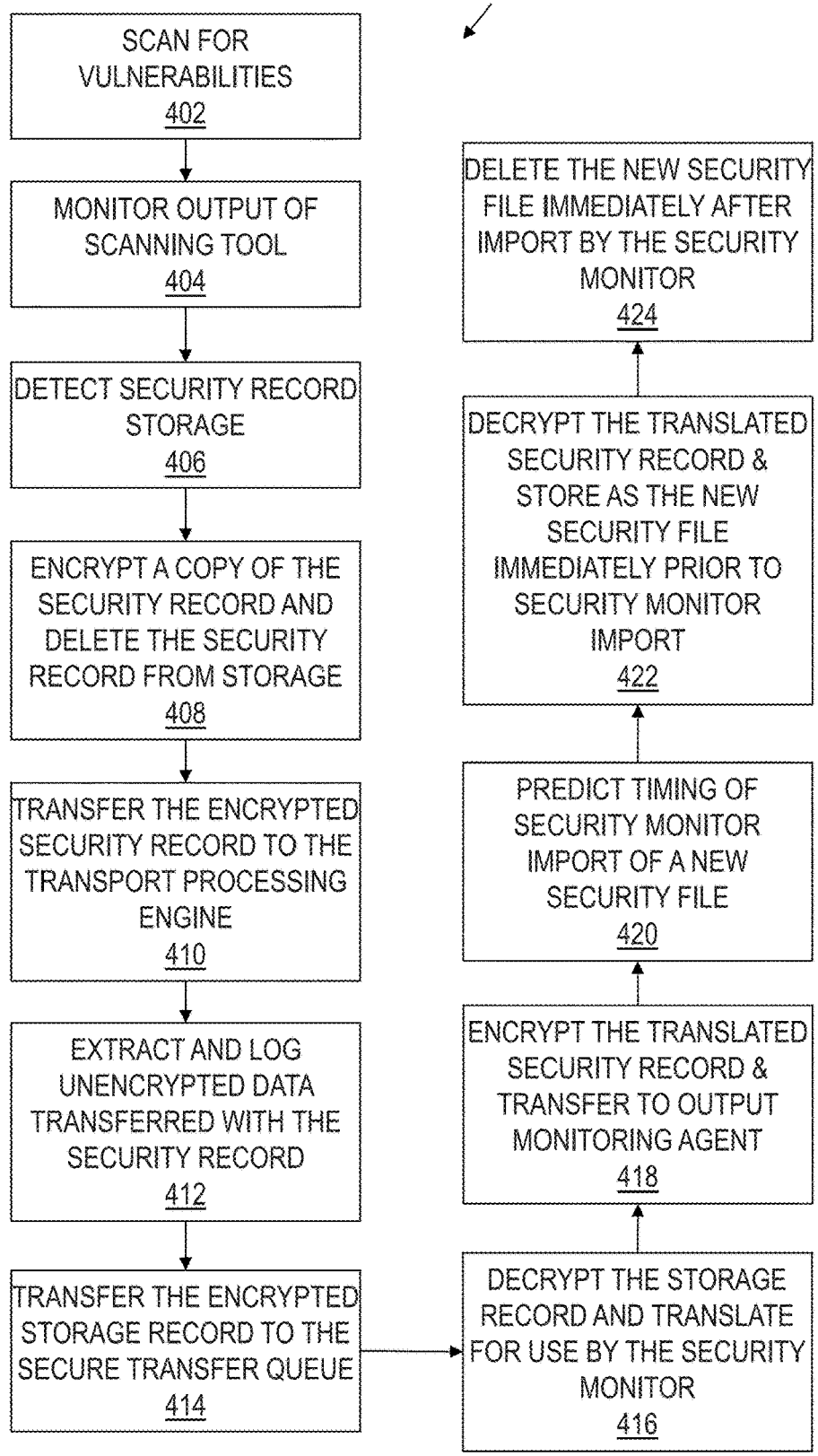
FIGS. 4 and 5 show flow diagrams for methods for secure transport of security information in accordance with various examples.
Figure 5:
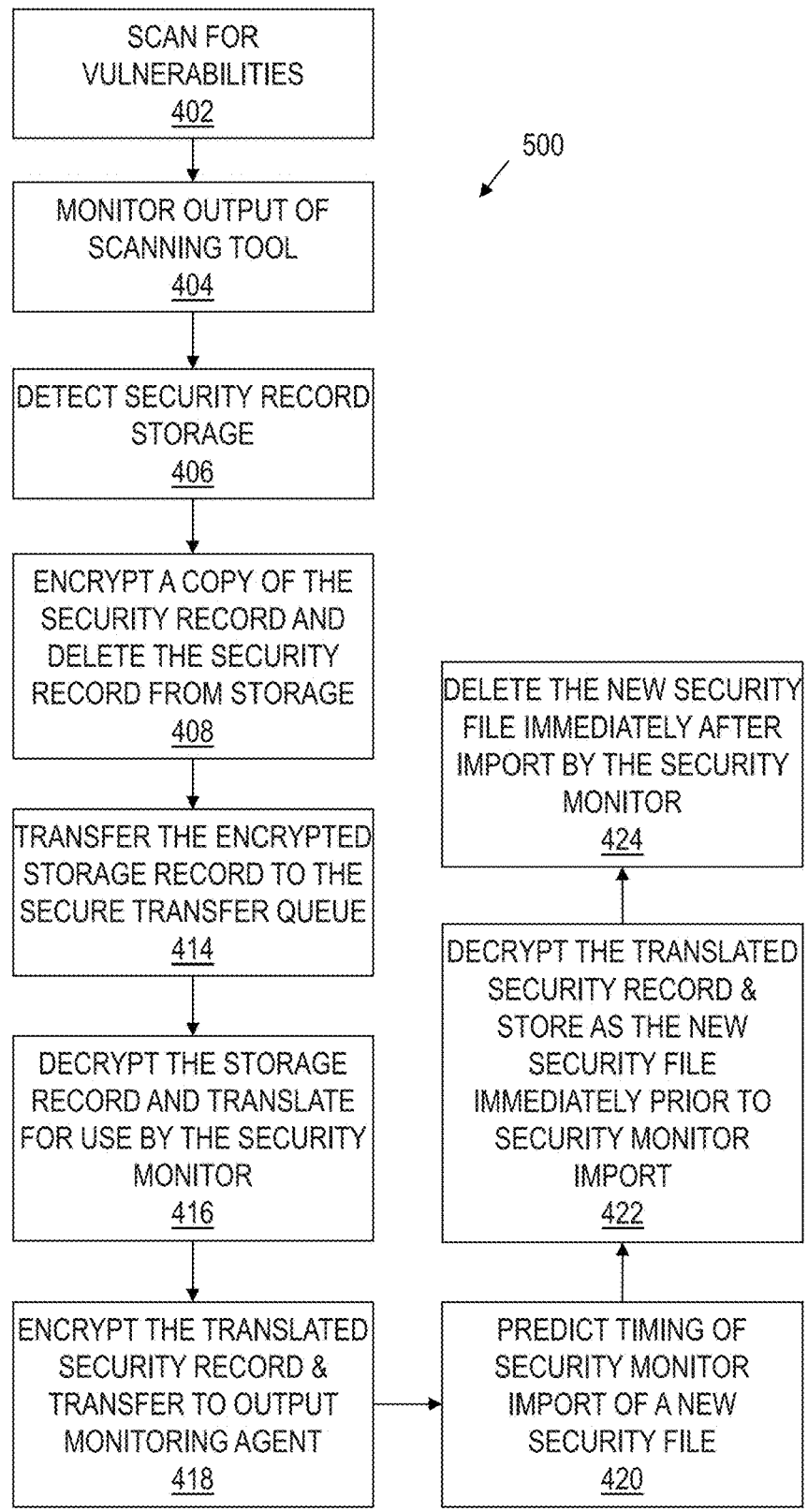

FIGS. 4 and 5 show flow diagrams for methods 400 and 500 for secure transport of security information in accordance with various examples. Though depicted sequentially as a matter of convenience, at least some of the actions shown can be performed in a different order and/or performed in parallel. Additionally, some implementations may perform only some of the actions shown. In some implementations, at least some of the operations of the methods 400 and 500 can be implemented as instructions stored in a storage device and executed by one or more processors.

In block 402, the security scanning tool 118 is scanning the computers of the system 100 for vulnerabilities. The scanning may include reading storage of the computers and comparing stored data and programming to predetermined patterns that are characteristic of vulnerabilities, malicious software, and other potential security deficiencies.

In block 404, the input monitoring agent 104 is monitoring output of the security scanning tool 118. Monitoring the output of the security scanning tool 118 may include monitoring a storage system for output files or records written by the security scanning tool 118 when a vulnerability or other security deficiency is identified.

In block 406, the security scanning tool 118 has identified vulnerability 124 in computer 122. The security scanning tool 118 writes security record 114 to a file on a storage system. Security record 114 identifies vulnerability 124 and computer 122, and may provide additional information regarding detection of vulnerability 124 (e.g., time of detection, location within computer 122, etc.).

The input monitoring agent 104 detects creation, on a storage device accessible to both the security scanning tool 118 and the input monitoring agent 104, of the security record 114 (e.g., detected as creation of a file on the storage device) by the security scanning tool 118, and detects completion of storage of the security record 114 in the storage device. The input monitoring agent 104 may utilize file system calls provided by a host operating system to detect storage of the security record 114 (e.g., file opening and closing).

In block 408, the input monitoring agent 104 copies the security record 114 from the storage device in which the security scanning tool 118 stored the security record 114, and deletes the security record 114 stored by the security scanning tool 118 from the storage device. The input monitoring tool 104 encrypts the copy of the security record 114. By detecting the security record 114 immediately after storage by the security scanning tool 118, encrypting a copy of the security record 114 and immediately deleting the original security record 114 from the storage device, the input monitoring agent 104 reduces the likelihood of the security record 114 being tampered with by a malicious entity. The input monitoring agent 104 may generate a new symmetric encryption key to encrypt the (i.e., each) security record 114, and may encrypt the encryption key using the public key of the secure transfer queue 108.

In block 410, the input monitoring agent 104 transfers the encrypted copy of the security record 114, the encrypted encryption key, and other information related to the security record 114 to the transport processing engine 106. The input monitoring agent 104 may initiate a secure communication link with the transport processing engine 106 to execute the transfer. The input monitoring agent 104 may terminate the secure communication link on completion of the transfer.

In block 412, the transport processing engine 106 extracts from the information transferred with the encrypted copy of the security record 114 (after verifying a digital signature around the information transferred) and unencrypted data describing the security record 114. The transport processing engine 106 generates a log entry that includes the unencrypted data, and writes the log entry to the transfer audit log 112 to provide a record of the transfer.

In block 414, the transport processing engine 106 transfers the encrypted storage record 114, and other information received from the input monitoring agent 104 with the encrypted storage record 114, to the secure transfer queue 108.

In block 416, the secure transfer queue 108 validates a signature accompanying the information transferred with the encrypted copy of the security record 114. If the signature fails to validate, then the secure transfer queue 108 may discard the encrypted copy of the security record and associated information. If the signature is validated, then the secure transfer queue 108 determines whether the encrypted security record 114 is to be translated for use by the security monitor 120. Information specifying the format of the security record 114 and the format used by the security monitor 120 is provided by the input monitoring agent 104 in conjunction with the encrypted security record 114.

The secure transfer queue 108 uses its private key to decrypt the encrypted symmetric encryption key used to encrypt the security record 114. After decryption of the symmetric encryption key, the secure transfer queue 108 applies the decrypted symmetric encryption key to decrypt the encrypted security record 114. The secure transfer queue 108 translates the decrypted security record 114 (if necessary), thereby placing the security record 114 in the format used by the security monitor 120.

In block 418, the secure transfer queue 108 encrypts the translated security record 114. The secure transfer queue 108 may generate a new symmetric encryption key for use in encrypting the translated security record 114 (or each security record 114 transferred by the secure transfer queue 108). The secure transfer queue 108 may encrypt the new symmetric encryption key using the public key of the output monitoring agent 110. The secure transfer queue 108 transfers the encrypted translated security record 114 and the encrypted symmetric encryption key used to encrypt the translated security record 114 to the output monitoring agent 110.

In block 420, the output monitoring agent 110 is monitoring operation of the security monitor 120, and, in particular, is monitoring the security file input timing of the security monitor 120. The output monitoring agent 110 predicts a future time at which the security monitor 120 will attempt to import a new security file. A security file includes the contents of a security record generated by a security scanning tool 118.

In block 422, immediately (e.g., within a few, 15 or less, seconds) prior to the time of a predicted security file import attempt by the security monitor 120, the output monitoring agent 110 decrypts the encrypted symmetric encryption key used to encrypt the translated security record 114 using the private key of the output monitoring agent 110. After decryption of the symmetric encryption key, the output monitoring agent 110 applies the decrypted symmetric encryption key to decrypt the encrypted translated security record 114. The output monitoring agent 110 stores the decrypted translated security record 114, on a storage device accessible to both the output monitoring agent 110 and the security monitor 120, as a security file 116 to be imported by the security monitor 120.

In block 424, the output monitoring agent 110 is monitoring importation of the security file 116 containing the translated security record 114 by the security monitor 120. When the output monitoring agent 110 determines that importation of the security file 116 by the security monitor 120 is complete, the output monitoring agent immediately deletes the security file 116 from the storage device. By decrypting the security record 114 immediately prior to importation by the security monitor 120, and deleting the decrypted security file 116 immediately after importation by the security monitor 120, the output monitoring agent 110 reduces the likelihood of the security record 114 being tampered with by a malicious entity.

The security monitor 120 may process the imported security record 114, and schedule the vulnerability identified in the security record 114 for remediation.

Figure 6:
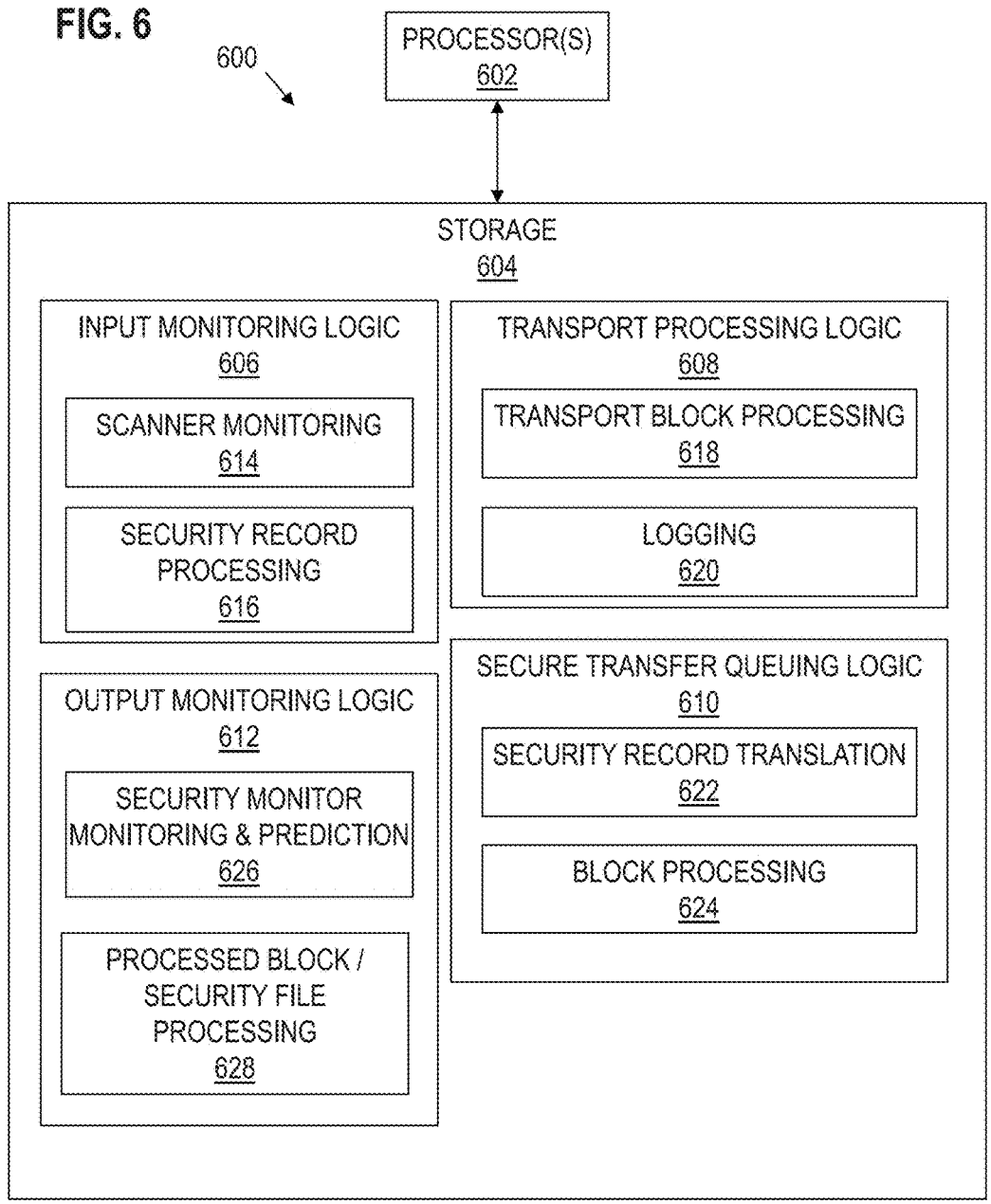
FIG. 6 shows a block diagram of a computer configured for secure transport of security information in accordance with various examples.

FIG. 6 shows a block diagram of a computer 600 configured for secure transport of security information in accordance with various examples. The computer 600 may include various components and systems that have been omitted from FIG. 6 in the interest of clarity. For example, the computer 600 may include network adapters, display systems, user interfaces, etc. In some implementations, the computer 600 may include a plurality of communicatively coupled computers.

The computer 600 includes one or more processors 602 and storage 604 coupled to the processors 602. The processor 602 is a general-purpose microprocessor, a digital signal processor, a microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and subsystems.

The storage 604 is a computer-readable storage device (i.e., a non-transitory computer-readable storage medium) that includes volatile storage such as random access memory, non-volatile storage (e.g., a hard drive, an optical storage device (e.g., CD or DVD), FLASH storage, read-only-memory), or combinations thereof. The storage 604 includes input monitoring logic 606, transport processing logic 608, secure transfer queuing logic 610, and output monitoring logic 612.

The input monitoring logic 606 includes instructions executable by the processors 602 to implement the input monitoring agent 104. Thus, the input monitoring agent 104 comprises one or more processors 602 and instructions of the input monitoring logic 606. The input monitoring logic 606 includes scanner monitoring logic 614 and security record processing logic 616. The scanner monitoring logic 614 includes instructions executable by the processors 602 to detect creation and completion of security record 114 by the security scanning tool 118 as described herein. The security record processing logic 616 includes instructions executable by the processors 602 to perform the encryption and transport block generation operations described herein.

The output monitoring logic 612 includes instructions executable by the processors 602 to implement the output monitoring agent 110. Thus, the output monitoring agent 110 comprises one or more processors 602 and instructions of the output monitoring logic 612. The output monitoring logic 612 includes security monitor monitoring and prediction logic 626 and processed block/security file processing logic 628. The security monitor monitoring and prediction logic 626 includes instructions executable by the processors 602 to monitor operation of the security monitor 120, to predict a time of file importation by the security monitor 120, and to detection completion of file importation by the security monitor 120 as described herein. The processed block/security file processing logic 628 includes instructions executable by the processors 602 to decrypt encrypted symmetric encryption keys and security records, and to generate a security file 116 that includes the decrypted security record as described herein.

The transport processing logic 608 includes instructions executable by the processors 602 to implement the transport processing engine 106. Thus, the transport processing engine 106 comprises one or more processors 602 and instructions of the transport processing logic 608. The transport processing logic 608 includes transport block processing logic 618 and logging logic 620. The transport block processing logic 618 includes instructions executable by the processors 602 to perform parsing and routing of the transport blocks received from the input monitoring agent 104 as described herein. The logging logic 620 includes instructions executable by the processors 602 to construct audit log entries from information extracted from a transport block, and to store the log entries in the transfer audit log 112 as described herein.

The secure transfer queuing logic 610 includes instructions executable by the processors 602 to implement the secure transfer queue 108. Thus, the secure transfer queue 108 comprises one or more processors 602 and instructions of the secure transfer queuing logic 610. The secure transfer queuing logic 610 includes security record translation 622 and block processing 624. The security record translation 622 includes instructions executable by the processors 602 to translate security records from a format used by security scanning tool 118 to a format used by the security monitor 120 as described herein. The block processing 624 includes instructions executable by the processors 602 to parse the transport block, decrypt symmetric encryption keys with dual assymetric keys, decrypt security records, generate new symmetric encryption keys, encrypt translated security records, encrypt symmetric encryption keys with dual assymetric keys, construct processed blocks, etc. as described herein.

Numerous variations of the system 100 are possible. For example, in constructing the transport block, the input monitoring agent 104 encrypts the security record 114 with a locally generated symmetric key, then encrypts the symmetric key with the public key of the secure transfer queue 108. If no infrastructure exists to maintain public keys, then a token service may be employed to deliver a token to the input monitoring agent 104 that would contain the necessary keying material (e.g., a symmetric key) so the security record 114 can be secured for processing by the secure transfer queue 108. Similarly, when the secure transfer queue 108 is encrypting the data field in the processed block for the output monitoring agent 110, the secure transfer queue 108 can obtain a token that would contain the necessary keying material so the data field of the processed block can be secured processing by the output monitoring agent 110.

In implementations in which the security scanning tool 118 is capable of communicating directly with the security monitor 120, only portions of the security information transfer subsystem 102 may be utilized. For example, if the security scanning tool 118 can securely communicate with the security monitor 120, but is incapable of transforming the data into a format useable by the security monitor 120, then the security information transfer subsystem 102 may be applied to transform the data. In this mode of operation, the security scanning tool 118 may directly communicate the data to be transformed to the transport processing engine 106; thus, an input monitoring agent 104 need not be utilized. The transport processing engine 106 can package the data in a transport block and transfer the data to the secure transfer queue 108. The secure transport queue 108 can translate the data, and the transport processing engine 106 can directly communicate the transformed data to the security monitor 120. The transport processing engine 106 audit/logging services may be used to document the transaction and data transformation flow.

If the security scanning tool 118 can translate the security record 114 into a form useable by the security monitor 120, then the security information transfer subsystem 102 may be utilized to provide logging services. The transport processing engine 106 may be used as a "pass through" type function that forwards pertinent data to the transfer audit log 112 to document the data flow. In this mode of operation, data may be directly sent to the transport processing engine 106, which could then forward details of the data to the transfer audit log 112, and immediately establish a secure link with the security monitor 120 to deliver the security record 114.

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A computing system, comprising:
a security information transfer subsystem, comprising:
an input monitoring agent to:
monitor output of a security scanning application;
detect storage of a security record by the security scanning application;
encrypt a copy of the security record; and
delete the security record after the copy is encrypted;
a secure transfer queue to:
decrypt the copy of the security record;
translate the decrypted copy of the security record to a form useable by a security monitor application; and
encrypt the translated copy of the security record; and
an output monitoring agent to:
predict a time when the security monitor application will attempt to import a new unencrypted security file;
decrypt the encrypted translated security record no more than a time interval prior to the predicted time;
store the decrypted translated security record as the new unencrypted security file; and
delete the new unencrypted security file after the security monitor application imports the file.

2. The system of claim 1, wherein the input monitoring agent is to:
generate a transport block that includes the encrypted copy of the security record;
wherein the system further comprises a transport processing engine to:
receive the transport block from the input monitoring agent;
extract, from the transport block, information describing content of the security record; and
record and store the information in a security information transfer audit log;
wherein the input monitoring agent is to further to establish a secure communication link with the transport processing engine; and transfer the transport block to the transport processing engine via the secure link.

3. The system of claim 1, wherein the input monitoring agent is to apply a public key provided by the secure transfer queue to encrypt a symmetric encryption key applied to encrypt the copy of the security record, and transfer the encrypted symmetric encryption key in conjunction with the encrypted copy of the security record.

4. The system of claim 1, wherein the secure transfer queue is to:
extract from data provided by the input monitoring agent, in conjunction with the encrypted security record, information specifying a format of the security record provided by the security scanning application, and a format of a security record useable by the security monitor application;
translate the decrypted copy of the security record using the information;
create a new symmetric encryption key;
apply the new encryption key to encrypt the translated copy of the security record;
encrypt the new symmetric encryption key using a public key of the output monitoring agent; and
transfer the encrypted new symmetric encryption key to the output monitoring agent in conjunction with the encrypted translated security record.

5. The system of claim 1, wherein the secure transfer queue to:
establish a secure communication link with the output monitoring agent;
transfer the encrypted translated security record to the output monitoring agent via the secure link; and
terminate the secure link on completion of transfer of the encrypted translated security record.

6. A method, comprising:
scanning a computing system for vulnerabilities;
monitoring, by an input monitoring agent, output of a security scanning tool performing the scanning;
detecting, by the input monitoring agent, storage of a security record by the security scanning tool;
encrypting, by the input monitoring agent, a copy of the security record; and
deleting, by the input monitoring agent, the security record stored by the security scanning tool on completion of the copy of the security record;
transferring the encrypted security record to a secure transfer queue;
decrypting, by the secure transfer queue, the encrypted copy of the security record;
translating, by the secure transfer queue, the decrypted copy of the security record to a form useable by a security monitor application;
encrypting, by the secure transfer queue, the translated copy of the security record;
transferring, by the secure transfer queue, the encrypted translated security record to an output monitoring agent;
predicting, by the output monitoring agent, when the security monitor application will attempt to import a new security file;
decrypting, by the output monitoring agent, the encrypted translated security record no more than a predetermined time interval prior to a predicted time that the security monitor application will attempt to import the new security file;
storing, by the output monitoring agent, the decrypted translated security record as the new security file; and
deleting, by the output monitoring agent, the new security file based on the security monitor application having completed importation of the file.

7. The method of claim 6, wherein transferring the encrypted security record to the secure transfer queue comprises:
transferring the encrypted security record via a transport processing engine;
establishing a secure communication link with the transport processing engine;
and transferring the encrypted security record to the transport processing engine via the secure link; and
in the transport processing engine:
extracting from data provided by the input monitoring agent in conjunction with the encrypted security record, information describing content of the security record; and
storing the information in a security information transfer audit log.

8. The method of claim 6, wherein encrypting the copy of the security record comprises applying a public key of the secure transfer queue to encrypt a symmetric encryption key applied to encrypt the copy of the security record, and transferring the encrypted security record to the secure transfer queue comprises transferring the encrypted symmetric encryption key in conjunction with the encrypted copy of the security record.

9. The method of claim 6, further comprising:
extracting, by the secure transfer queue, from data provided by the input monitoring agent, in conjunction with the encrypted security record, information specifying an arrangement of the security record provided by the security scanning application, and an arrangement of a security record useable by the security monitor application;
translating the decrypted copy of the security record using the information;
creating a new symmetric encryption key;
applying the new symmetric encryption key to encrypt the translated copy of the security record;
encrypting the new symmetric encryption key using a public key of output monitoring agent; and
transferring the encrypted new symmetric encryption key to the output monitoring agent in conjunction with the encrypted translated security record.

10. A computing system, comprising:
a security information transfer subsystem, comprising:
an input monitoring agent to:
monitor output of computer system security scanning application;
detect storage of a security record by the security scanning application;
generate a copy of the security record stored by the security scanning application;
delete the security record stored by the security scanning application on completion of the copy of the security record;
encrypt the copy of the security record; and
generate a transport block that includes the encrypted copy of the security record;
a transport processing engine to:
receive the transport block from the input monitoring agent;
extract, from the transport block, information describing content of the security record; and
store the information in a security information transfer audit log;
a secure transfer queue to:
receive the transport block from the transport processing engine;
decrypt the copy of the security record;
translate the decrypted copy of the security record to a form useable by a security monitor;
encrypt the translated copy of the security record; and
generate a processed block that includes the encrypted translated copy of the security record; and
an output monitoring agent to:
receive the encrypted, translated security record;

monitor input timing of the security monitor;
decrypt the encrypted, translated security record no more than a predetermined time interval prior to when, based on the monitored input timing of the security monitor, the security monitor is to check for availability of a file containing the translated security record;
create the file containing the decrypted translated security record in storage that is accessible to the security monitor;
determine whether the security monitor has imported the file containing the decrypted translated security record;
delete the file containing the decrypted translated security record from the storage based on the security monitor having completed importation of the file.

11. The system of claim 10, wherein the input monitoring agent is to establish a secure communication link with the transport processing engine, and transfer the transport block to the transport processing engine via the secure link.

12. The system of claim 10, wherein the input monitoring agent is to apply a public key of the secure transfer queue to encrypt a symmetric encryption key applied to encrypt the copy of the security record, and include the encrypted symmetric encryption key in the transport block.

13. The system of claim 10, wherein the secure transfer queue is to:
extract from the transport block information specifying an arrangement of the security record provided by the security scanning application, and an arrangement of a security record useable by a security monitor;
translate the decrypted copy of the security record using the information.

14. The system of claim 10, wherein the secure transfer queue is to:
create a new symmetric encryption key;
apply the new symmetric encryption key to encrypt the translated copy of the security record;
encrypt the new symmetric encryption key with a public key of the output monitoring agent;
include the encrypted new symmetric encryption key in the processed block;
establish a secure communication link with the output monitoring agent;
transfer the processed block to the output monitoring agent via the secure link; and
terminate the secure link on completion of transfer of the processed block.

15. The system of claim 10, wherein the security scanning application is to continually monitor computers of the computer system for security vulnerabilities, and the security monitor is to track resolution of the security vulnerabilities.

* * * * *